United States Patent
Pessi (10) Patent No.: US 7,653,079 B2
(45) Date of Patent: Jan. 26, 2010

(54) SIGNAL MESSAGE COMPRESSION (75) Inventor: Pekka Pessi, Helsinki (FI)

(73) Assignee: Nokia Corporation, Espoo (FI)

( * ) Notice: Subject to any disclaimer, the term of this patent is extended or adjusted under 35 U.S.C. 154(b) by 816 days.

(21) Appl. No.: 11/249,350

(22) Filed: Oct. 14, 2005

(65) Prior Publication Data

US 2007/0002855 A1  Jan. 4, 2007

(30) Foreign Application Priority Data

Jun. 30, 2005  (GB) ................................ 0513432.5

(51) Int. Cl.
*H04L 12/28* (2006.01)
(52) U.S. Cl. .................... 370/412; 370/338; 709/247
(58) Field of Classification Search ................... None
See application file for complete search history.

(56) References Cited

U.S. PATENT DOCUMENTS

2002/0059462 A1* 5/2002 Hannu et al. ................ 709/247
2002/0132613 A1  9/2002 Leung et al.
2003/0120813 A1  6/2003 Majumdar et al.
2003/0233478 A1* 12/2003 Chuah et al. ................ 709/247
2006/0291437 A1* 12/2006 Naqvi et al. ................ 370/338
2007/0002780 A1*  1/2007 Pessi .......................... 370/261

FOREIGN PATENT DOCUMENTS

EP  1376878  1/2004
WO  WO 2005/011175  2/2005

* cited by examiner

*Primary Examiner*—Duc C Ho
(74) *Attorney, Agent, or Firm*—Mintz, Levin, Cohn, Ferris, Glovsky, and Popeo, P.C.

(57) ABSTRACT

A method for compressing a signalling message in a compressor in a communication system. The compressor comprising a compression memory, wherein the compression memory comprises a first memory in a virtual machine and a second memory external to the virtual machine. The method comprising the steps of: receiving a part of the signalling message; searching the second memory for a copy of the received part of the signalling message; and determining a reference to the received part of the signalling message on the basis of the searching step; outputting the reference as a part of the compressed signalling message representing the received part of the signalling message.

27 Claims, 5 Drawing Sheets

SIGNAL MESSAGE COMPRESSION

FIELD OF THE INVENTION

The present invention relates to communication systems, and in particular, to signal message compression within communication sessions handling SIP messages.

DESCRIPTION OF THE RELATED ART

A communication system can be seen as a facility that enables communication sessions between two or more entities such as user equipment and/or other nodes associated with the communication system. The communication may comprise, for example, communication of voice, data, multimedia and so on. A user equipment may, for example, be provided with a two-way telephone call or multi-way conference call. A user equipment may also be provided with a connection to an application providing entity, for example to an application server (AS), thus enabling use of services provided by the application server.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of "rules" on which the communication can be based on needs to be defined to enable communication by means of the system.

Communication systems providing wireless communication for user equipment are known. An example of the wireless systems is the public land mobile network (PLMN). Another example is a mobile communication system that is based, at least partially, on the use of communication satellites. Wireless communications may also be provided by means of other arrangements, such as by means of wireless local area networks (WLAN). Communication on the wireless interface between the user equipment and the elements of the communication network can be based on an appropriate communication protocol. The operation of the station apparatus of the communication system and other apparatus required for the communication can be controlled by one or several control entities. The various control entities may be interconnected. One or more gateway nodes may also be provided for connecting a communication network to other networks. For example, a mobile network may be connected to communication networks such as an IP (Internet Protocol) and/or other packet switched data networks.

An example of the services that may be offered for users of a communication system is the so called multimedia service. An example of a communication system enabled to offer multimedia services is the Internet Protocol (IP) Multimedia network. IP Multimedia (IM) functionalities can be provided by means of a IP Multimedia Core Network (CN) subsystem, or briefly IP Multimedia subsystem (IMS). The IMS includes various network entities for the provision of the multimedia services.

The Third Generation Partnership Project (3GPP) has defined use of the General Packet Radio Service (GPRS) as a backbone communication system for the provision of the IMS services, the GPRS being given herein as a non-limiting example of a possible backbone communication system enabling the multimedia services. The Third Generation Partnership Project (3GPP) has also defined a reference architecture for the third generation (3G) core network which will provide the users of user equipment with access to the multimedia services. This core network is divided into three principal domains. These are the Circuit Switched (CS) domain, the Packet Switched (PS) domain and the Internet Protocol Multimedia (IM) domain.

The latter of these, the IM domain, is for ensuring that multimedia services are adequately managed. The 3G IM domain supports the Session Initiation Protocol (SIP) as developed by the Internet Engineering Task Force (IETF). Session Initiation Protocol (SIP) is an application-layer control protocol for creating, modifying and terminating sessions with one or more participants (endpoints).

Before a user equipment is able to communicate with an IM CN subsystem, a GPRS attach procedure must be performed and a communication channel known as Packet Data Protocol (PDP) context for SIP signalling must be established.

With low-rate IP connectivity, transmission delays are significant. Call setup and feature invocation are adversely affected by retransmissions and multiple messaging, as required in some flows. SigComp protocols provide a solution to this problem by offering robust, loss-less compression of application messages. Due to the heavy signaling involved and SIP, being a text based protocol, 3GPP IMS Release 5 standards mandates SigComp (Signaling Compression).

Once a device is in receipt of a SigComp compressed message or a message to compress a uncompressed message using the SigComp protocols, the device provides a virtual machine (UDVM) with limited resources for compressing/decompressing the message.

The virtual machine is quite limited in its capabilities. For example the memory usable by the virtual machine is limited to the receive buffer used by the decompressing/compressing endpoint. The total amount of memory allocated for the receive buffer and virtual machine is typically only a few kilobytes. This is because for SIP endpoints the default decompression memory size (dms) is 8 kilobytes, therefore in the virtual machine for compression and decompression both instructions and data must fit within this limited space. The virtual machine program is allowed simple I/O operations: it can input data from the compressed message, it can output decompressed data, and it can create, access and free state items. State items are items stored within the virtual machine memory from previously received messages.

The memory used by a UDVM is typically 4 kilobytes or less. Part of it is consumed by bytecode and its variables. Typically, there is only 3.5 kilobytes or less available for the ring buffer and other data structures storing the received compressed message, the processed decompressed message and any further dictionaries. When compressing longer messages, it is not possible to keep known static (3468 or 4836 bytes depending on algorithm) and dynamic dictionaries as well as complete compressed message completely in the memory.

The UDVM is active only when the protocol message is received. After receiving a SigComp message, the endpoint invokes the UDVM. For example in decompression the UDVM executes the bytecode or instructions to perform the decompression steps until the message has been completely decompressed or an error occurs. The UDVM can save data between UDVM instances in form of the state items. The state items can be used to make the compression more efficient; they can be used to store the compression algorithms or compression context within a compressed session. A SigComp session endpoint is called compartment. The amount of data that a decompressor can store within each compartment is also severely limited, the default value of the state memory size (sms) is 2048 bytes for SIP endpoints, for instance.

Typically the UDVM when initiated loads the ring buffer part of the available memory with data from compartments such as the SIP dictionary, values which represent commonly used terms in decompressed SIP messages. The UDVM then loads the decompressed message into the ring buffer as it is being decompressed. If the decompressed message is particularly large the loading of the decompressed message can effectively overwrite the initially loaded dictionary. This creates the known problem of reducing the probability of detecting a symbol match in the ring buffer. As the efficiency of the compression and decompression is dependent on the dictionary being used, any degradation of the dictionary reduces the efficiency of the compression.

SUMMARY OF THE INVENTION

Embodiments of the present invention aim to at least partially address the above problem.

There is provided according to the present invention a method for compressing a signalling message in a compressor in a communication system, the compressor comprising a compression memory, wherein the compression memory comprises a first memory in a virtual machine and a second memory external to the virtual machine; the method comprising the steps of: receiving a part of the signalling message; searching the second memory for a copy of the received part of the signalling message; determining a reference to the received part of the signalling message on the basis of the searching step; and outputting the reference as a part of the compressed signalling message representing the received part of the signalling message.

The method may comprise the further step of further searching the first memory for a copy of the received part of the signalling message; and wherein the reference may be determined on the basis of the searching and the further searching steps.

The method may further comprise the further step of prior to the step of receiving a part of the signalling message writing data to the second memory.

The method may comprising the further step of writing a copy of the received part of the signalling message to the first memory after determining a reference to the received part.

The first memory may comprise a ring buffer.

The second memory may comprise at least one of: a dynamic dictionary; and a static dictionary.

The virtual machine may be a universal decompression virtual machine.

According to a second aspect of the present invention there is provided a method for decompressing a compressed signalling message in a decompressor in a communications system, the decompressor comprising a decompression memory, wherein the decompression memory comprises a first memory in a virtual machine and a second memory external to the virtual machine, the method comprising the steps of: receiving a part of the compressed message; determining whether the part of the compressed message comprises a second memory reference; selecting a value on the basis of the determining step, and outputting the value as a part of a decompressed message.

The method may comprise the further step of further determining whether the received part of the compressed message comprises a first memory reference and wherein the value may be selected on the basis of the determining and the further determining steps.

The method may comprise the further step of prior to the step of receiving a part of the compressed message writing data to the second memory.

The method may comprise the further step of writing a copy of the value to the first memory.

When the determining step determines a first memory reference the selecting step may comprise the step of reading the content of the first memory reference from the first memory; wherein the selected value may be the content of the first memory reference.

When the determining step determines a second memory reference the selecting step may comprise the step of reading the content of the second memory reference from the second memory; wherein the selected value may be the content of the second memory reference.

When the determining step determines no first memory reference or no second memory reference the selected value may be the received part of the compressed message.

The virtual machine may be a universal decompression virtual machine.

According to a third aspect of the present invention there is provided a compressor for compressing a signalling message in a communication device operating within a communications system, the compressor comprising: a first memory in a virtual machine; a second memory external to the virtual machine; the virtual machine further comprising: a receiver arranged to receive the content of a part of the signalling message, a comparator arranged to compare the received content with at least one of a content of the first memory and the second memory, a reference generator arranged to receive an output from the comparator, and output a reference value, wherein the reference value output is arranged to be dependent on the output from the comparator, and wherein the reference value output from the compressor is part of the compressed signalling message.

The compressor may further comprise a memory loader arranged to write the content received from the receiver to the first memory.

The first memory may comprise a ring buffer.

The second memory may comprise at least one of: a static dictionary; and a dynamic dictionary.

The virtual machine may be a universal compression virtual machine.

According to a fourth aspect of the present invention there is provided a decompressor for decompressing a signalling message in a communication system, comprising: a first memory in a virtual machine, a second memory external to the virtual machine; the virtual machine further comprising: a receiver arranged to receive a part of the compressed message; a detector arranged to detect whether the received part of the compressed message comprises a reference to the first memory or the second memory and arranged an output dependent on the detection; a value generator arranged to output a value dependent on the output of the detector, wherein the value output is part of a decompressed message.

The decompressor may further comprise a memory loader arranged to write the value generated to the first memory.

The first memory may comprise a ring buffer.

The second memory may comprise at least one of: a static dictionary; and a dynamic dictionary.

The virtual machine may be a universal compression virtual machine.

According to a fifth aspect of the present invention there is provided a computer program product implementing a method for compressing a signalling message in a compressor in a communication system, the compressor comprising a compression memory, wherein the compression memory comprises a first memory in a virtual machine and a second memory external to the virtual machine; the method comprising the steps of: receiving a part of the signalling message; searching the second memory for a copy of the received part of the signalling message; determining a reference to the received part of the signalling message on the basis of the searching step; and outputting the reference as a part of the compressed signalling message representing the received part of the signalling message.

According to a sixth aspect of the present invention there is provided a computer program product implementing a method for decompressing a compressed signalling message in a decompressor in a communications system, the decompressor comprising a decompression memory, wherein the decompression memory comprises a first memory in a virtual machine and a second memory external to the virtual machine, the method comprising the steps of: receiving a part of the compressed message; determining whether the part of the compressed message comprises a second memory reference; selecting a value on the basis of the determining step, and outputting the value as a part of a decompressed message.

BRIEF DESCRIPTION OF THE DRAWINGS

For better understanding of the present invention, reference will now be made by way of example to the accompanying drawings in which.

DETAILED DESCRIPTION OF THE PREFERRED EMBODIMENTS

Certain embodiments of the present invention will be described in the following by way of example, with reference to the exemplifying architecture of a third generation (3G) mobile communications system. However, it shall be appreciated that the embodiments may be applied to any suitable communication system.

Figure 1:
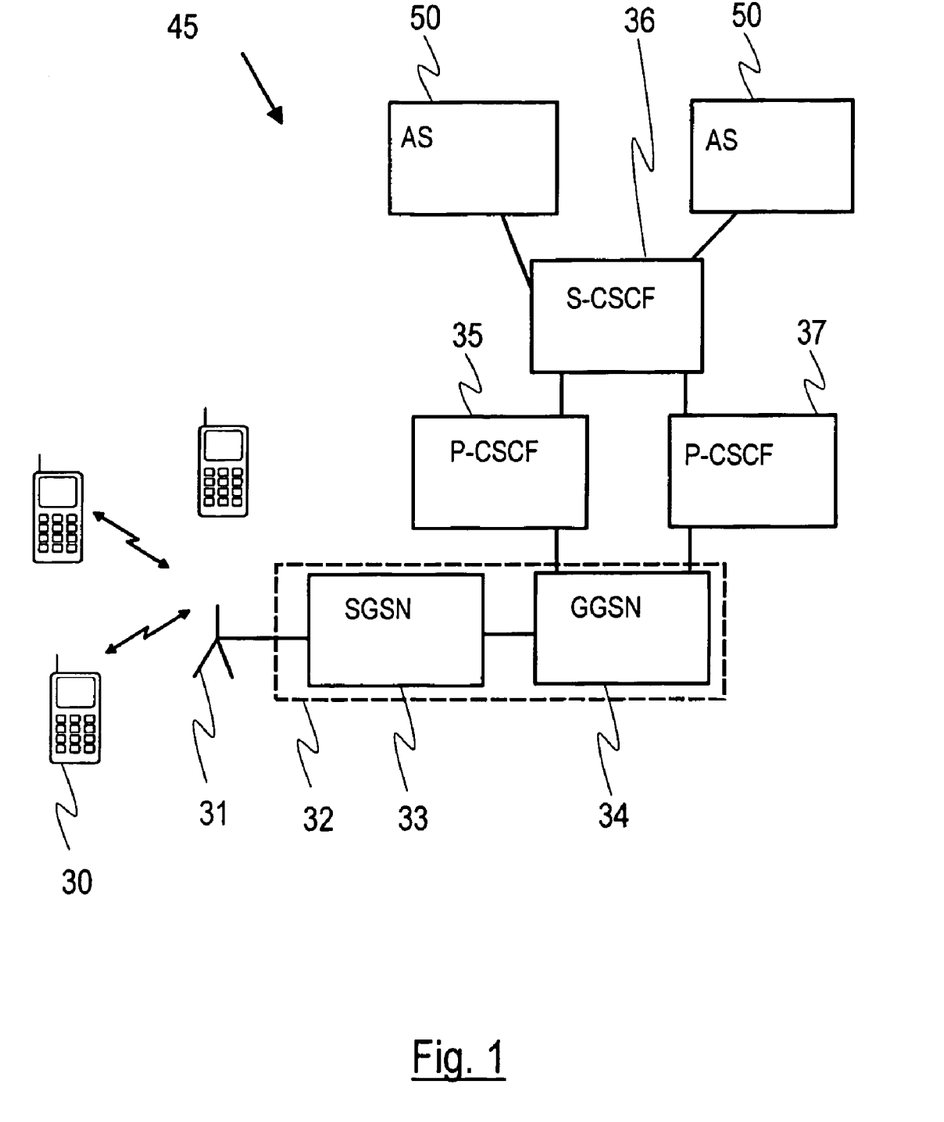
FIG. 1 shows a schematic view of a communication system environment wherein the invention can be embodied.

Reference is made to FIG. 1 which shows an example of a network architecture wherein the invention may be embodied. In FIG. 1 an IP Multimedia Network 45 is provided for offering IP multimedia services for IP Multimedia Network subscribers.

As described above, access to IP Multimedia (IM) services can be provided by means of a mobile communication system. A mobile communication system is typically arranged to serve a plurality of mobile user equipment usually via a wireless interface between the user equipment and at least one radio access node such as a base station 31 of the communication system. The mobile communication system may logically be divided between a radio access network (RAN) and a core network (CN).

The base station 31 is arranged to transmit signals to and receive signals from a mobile user equipment 30 via a wireless interface between the user equipment and the radio access network. Correspondingly, the mobile user equipment 30 is able to transmit signals to and receive signals from the radio access network via the wireless interface.

In the shown arrangement the user equipment 30 may access the IMS network 45 via the access network associated with the base station 31. It shall be appreciated that, although, for clarity reasons FIG. 1 shows a base station of only one radio access network, a typical communication network system usually includes a number of radio access networks.

The 3G radio access network (RAN) is typically controlled by appropriate radio network controller (RNC). This controller is not shown in order to enhance clarity. A controller may be assigned for each base station or a controller can control a plurality of base stations, for example in the radio access network level. It shall be appreciated that the name, location and number of the radio network controllers depends on the system.

The mobile user equipment 30 of FIG. 1 may comprise any appropriate mobile user equipment adapted for Internet Protocol (IP) communication to connect the network. For example, the mobile user may access the cellular network by means of a Personal computer (PC), Personal Data Assistant (PDA), mobile station (MS) and so on. The following examples are described with reference to mobile stations.

One skilled in the art is familiar with the features and operation of a typical mobile station. Thus, it is sufficient to note that the user may use a mobile station for tasks such as for making and receiving phone calls, for receiving and sending data from and to the network and for experiencing multimedia content or otherwise using multimedia services. A mobile station may include an antenna for wirelessly receiving and transmitting signals from and to base stations of the mobile communication network. A mobile station may also be provided with a display for displaying images and other graphical information for the user of the mobile user equipment. Camera means may be provided for capturing still or video images. Speaker means are also typically provided. The operation of a mobile station may be controlled by means of an appropriate user interface such as control buttons, voice commands and so on. Furthermore, a mobile station is provided with a processor entity and a memory means.

It shall be appreciated that although only few mobile stations are shown in FIG. 1 for clarity, a great number of mobile stations may be in simultaneous communication with a communication system.

A core network (CN) typically includes various switching and other control entities and gateways for enabling the communication via a number of radio access networks and also for interfacing a single communication system with one or more communication system such as with other cellular systems and/or fixed line communication systems. In the 3GPP systems the radio access network is typically connected to an appropriate core network entity or entities such as, but not limited to, a serving general packet radio service support node (SGSN) 33. The radio access network is in communication with the serving GPRS support node via an appropriate interface, for example on an Iu interface. The serving GPRS support node, in turn, typically communicates with an appropriate gateway, for example a gateway GPRS support node 34 via the GPRS backbone network 32. This interface is commonly a switched packet data interface.

In a 3GPP network, a packet data session is established to carry traffic flows over the network. Such a packet data session is often referred as a packet data protocol (PDP) context. A PDP context may include a radio bearer provided between the user equipment and the radio network controller, a radio access bearer provided between the user equipment, the radio network controller and the SGSN 33, and switched packet data channels provided between the serving GPRS service node 33 and the gateway GPRS service node 34. Each PDP context usually provides a communication pathway between a particular user equipment and the gateway GPRS support node and, once established, can typically carry multiple flows. Each flow normally represents, for example, a particular service and/or a media component of a particular service. The PDP context therefore often represents a logical communication pathway for one or more flows across the network. To implement the PDP context between user equipment and the serving GPRS support node, at least one radio access bearer (RAB) needs to be established which commonly allows for data transfer for the user equipment. The implementation of these logical and physical channels is known to those skilled in the art and is therefore not discussed further herein.

FIG. 1 shows also a plurality of application servers 50 connected to the exemplifying Internet Protocol (IP) Multimedia network 45. The user equipment 30 may connect, via the GPRS network 32 and an IMS network 45, to at least one of the application servers 50. It shall be appreciated that a great number of application servers may be connected to a data network.

Communication with the application servers is controlled by means of functions of the data network that are provided by appropriate controller entities. For example, in the current third generation (3G) wireless multimedia network architectures it is assumed that several different servers providing various control functions are used for the control. These include functions such as the call session or call state control functions (CSCFs). The call session functions may be divided into various categories. FIG. 1 shows proxy call session control functions (P-CSCF) 35 and 37 and a serving call session control function (S-CSCF) 36. It shall be appreciated that similar functions may be referred to in different systems with different names.

A user who wishes to use services provided by an application server via the IMS system may need first to register with a serving controller, such as the serving call session control function (S-CSCF) 36. The registration is required to enable the user equipment to request a service from the multimedia system. As shown in FIG. 1, communication between the S-CSCF 36 and the user equipment 30 may be routed via at least one proxy call session control function (P-CSCF) 35. The proxy CSCF 35 thus acts as a proxy which forwards messages from the GGSN 34 to a serving call session control function 36 and vice versa.

The REGISTER message used by the user above is one example of a SIP (session initiation protocol) message. Other request SIP messages include, INVITE which indicates a user or service is being invited to participate in a call session, ACK which confirms that the client has received a final response to an INVITE request, BYE which terminates a call and can be sent by either the caller or the callee, CANCEL which cancels any pending searches but does not terminate a call that has already been accepted, and OPTIONS which queries the capabilities of servers.

As has been described earlier it is known to compress these SIP messages using the protocol set known as SigComp. This protocol set is defined in IETF RFC (request for comments) 3320 "Signaling Compression (SigComp)". Furthermore in order to perform both compression and decompression within a device a UDVM (universal decompression virtual machine) is initiated for each message to be compressed or decompressed.

The UDVM initiated for a compression procedure is also known as a compressor. A UDVM initiated for a decompression procedure is also known as a decompressor. The UDVM on initiation is defined within a memory space specified by the SigComp protocols. The memory space used in a compression procedure is known as the compression memory space, and similarly the memory space used in a decompression procedure is known as a decompression memory space.

The typical compression algorithms used by the UDVM for SigComp protocol messages and data streams are the various known LZ77 compression algorithm variants. The LZ77 compression algorithm works by storing a history window of the most recently read data and comparing the current data being encoded with the data in the history window. The output compressed stream/message contains references to the position in the history window, and the length of the match. If a match cannot be found within the history window the character itself is simply encoded into the stream and flagged as a 'literal'. The compressed stream/message therefore comprises two types of symbols, literals and length/position pairs. The most popular variants of the algorithm family are the LZW, LZSS and DEFLATE algorithms. The differences between these lies in the algorithm used to search current data from the history window, the LZSS algorithm uses a simple binary tree search whereas the DEFLATE algorithm uses a hash table search.

The compression space as used in a SigComp procedure comprises a ring buffer which is arranged to store a copy of the previously received symbols of the decompressed message/data stream and which the compression algorithm uses as the history window to search for copies of the currently read symbols. A ring buffer as known in the art is a statically or dynamically allocated block of memory whereby the final memory location is linked to the first memory location in the block. Thus once the end location of the memory block is reached the operation is pointed back to the start location of the memory block to produce a continuous memory block. This process is also known as wrapping round the ring buffer 113.

A simplified example of the DEFLATE compression algorithm using the ring buffer, as defined in RFC 1951, is shown here for reference:

```
def DEFLATE(compressed_stream, ring, message):
    start = 0
    while start < len(message):
        s = message[start:]
        position, length = ring.search(s)
        s = s[:length]
        if length > 1:
            compressed_stream.append((length, position))
        else:
            compressed_stream.append(s)
        ring.append(s) # Insert match or literal into ring
        start += length
```

The algorithm shown above searches uncompressed parts of the message against data stored in the history window (ring). The search returns the length and the position of the longest match. If no match is found, length is 1, and the first byte of the search contents is inserted into compressed stream as a literal, else the length and position of the match is inserted into compressed stream. Then the compressed part of the message is appended to the ring buffer.

The typical algorithm used involves further steps such as that of backtracking the output stream if a longer match is found.

The LZ77 algorithms in order to improve the efficiency of the compression use previous messages or external dictionaries. As the efficiency of the compression is related to the ability to find prior examples of the input data then the use of previous messages stored in the history windows prevents the inefficiency of the first received symbols from always being inserted as 'literals'. In order to use these previous messages (also known as dictionaries), they are inserted into the history window prior to receiving the first part to compress. This process is sometimes known as populating the window history.

The SigComp compressors typically use the first received message as their dynamic dictionary.

However when the compressor is compressing a particularly long message or data stream the appending of the currently read message symbol to the ring buffer causes the read message to reach the end of the ring buffer and to overwrite the dictionary first stored. This degradation of the dictionary can often lead to a lowering of the efficiency of the compression algorithm.

Figure 2:
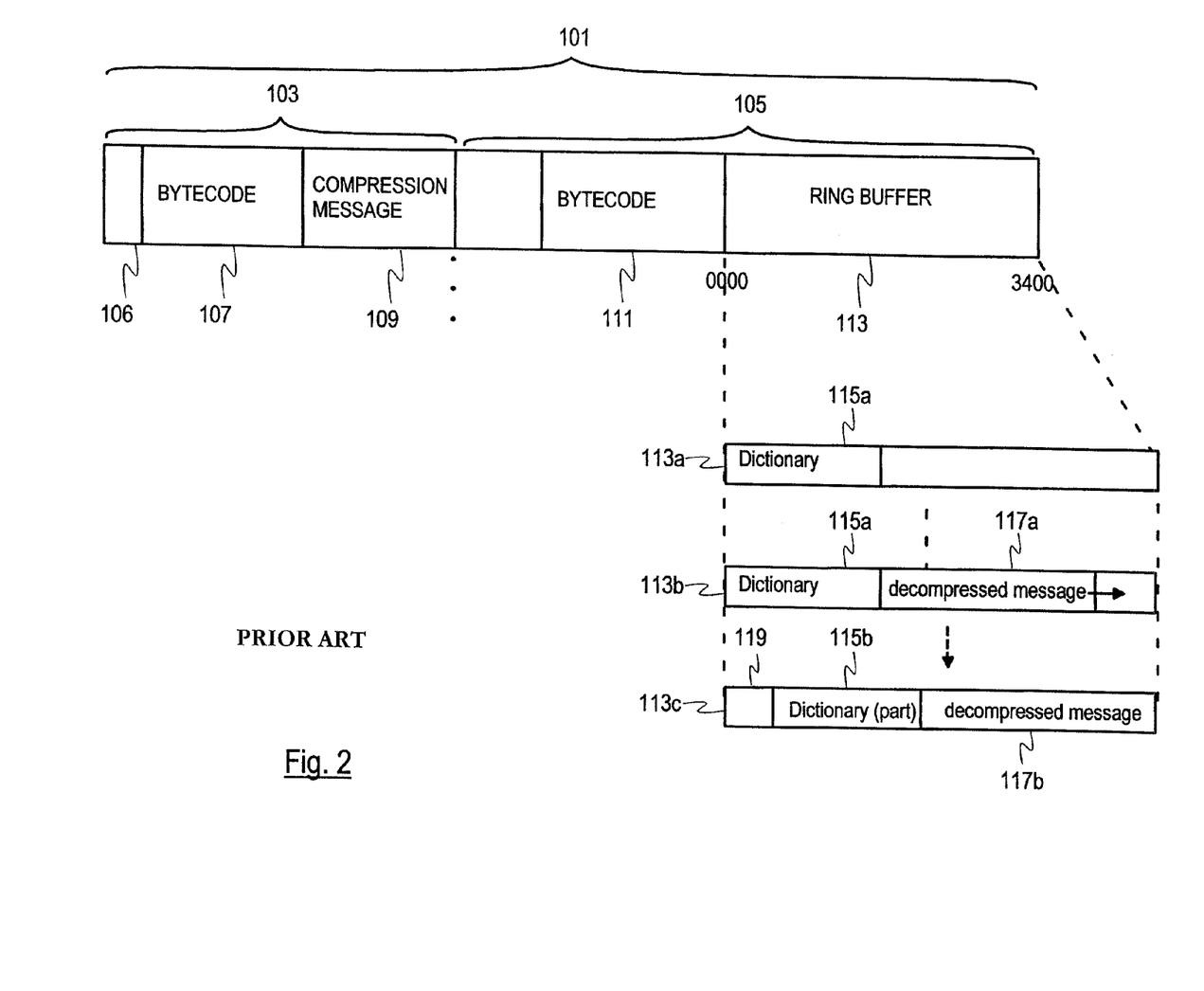
FIG. 2 is a schematic view of a typical UDVM memory system showing the operation of a typical dictionary within the memory block.

Referring now to FIG. 2 a typical decompression memory block 101 is shown as used by a decompressor in decompressing a message/data stream sent using the SigComp protocols. Although for simplicity the message is received and decompressed by a user terminal, the same process and structures required to carry out the process are employed by other communications devices in order to decompress similar messages.

The decompression memory block 101 used by the decompressor comprises a SigComp portion 103 and a UDVM portion 105. The SigComp portion 103 itself comprises a SigComp header portion 106 for storing any SigComp message header items, a Bytecode portion 107 for storing any received decompression algorithm instructions, and a compressed message portion 109 buffering at least part of the received compressed message or received compressed data stream. In some examples the Bytecode portion is not used as the instruction set used by the UDVM is loaded from a previously stored instruction set.

The UDVM portion 105 comprises a bytecode portion 111 for storing the instructions for carrying out the decompression and a ring buffer 113. The ring buffer 113 is used by the user terminal UDVM as the decompression 'history window' storing data which can be referenced by the received compressed message in order to reconstruct the original message.

The received data stream contains references to known locations within the ring buffer or contains the data itself in the form of a 'literal'.

FIG. 2 further shows the composition of a ring buffer 113 during three stages of a typical decompression operation.

The first detailed ring buffer memory block 113a shows the state of the ring buffer 113 just prior to decompressing a first part of the compressed message. The first detailed ring buffer memory block 113a comprises a dictionary part 115. The decompressor typically loads these dictionary data parts from state items into the ring buffer 113 either implicitly, when data is stored in the same state item as the bytecode or explicitly.

After the dictionary part 115 is stored, the decompressor is able to receive symbols from the compressed message memory part 109. If the received symbol is a literal, the symbol itself is inserted into the ring buffer, and furthermore output as part of the decompressed message. If the received symbol refers to a memory location or locations in the ring buffer (defined by a length/position pair), it is copied from the referenced locations of the ring buffer onto the end of ring buffer, and the copied data is furthermore output as part of the decompressed message.

The second detailed ring buffer memory block 113b shows a typical ring buffer after a first part of the message has been decompressed. The second detailed ring buffer memory block 113b comprises a dictionary portion 115a, which is the same as the dictionary portion loaded into the ring buffer prior to decompression and a decompressed message portion 117a containing the current decompressed message capable of being searched.

The third detailed ring buffer memory block 113c shows a typical ring buffer after the ring buffer has wrapped round. This occurs when the size of the dictionary part 115 and the decompressed message are larger than the ring buffer 113. The third detailed ring buffer memory block 113c comprises a partial dictionary 115b, a first decompressed message part 117b and an overwriting decompressed message part 119. The overwriting decompressed message part 119 has overwritten part of the dictionary as loaded. Although this will not produce a decompression error, as the compressor ring buffer at the equivalent stage has similarly overwritten the loaded dictionaries the overwriting of the dictionaries will have lowered the efficiency of the compression as the dictionaries are typically chosen for their greater compression efficiency qualities—containing often used strings of symbols.

Figure 3:
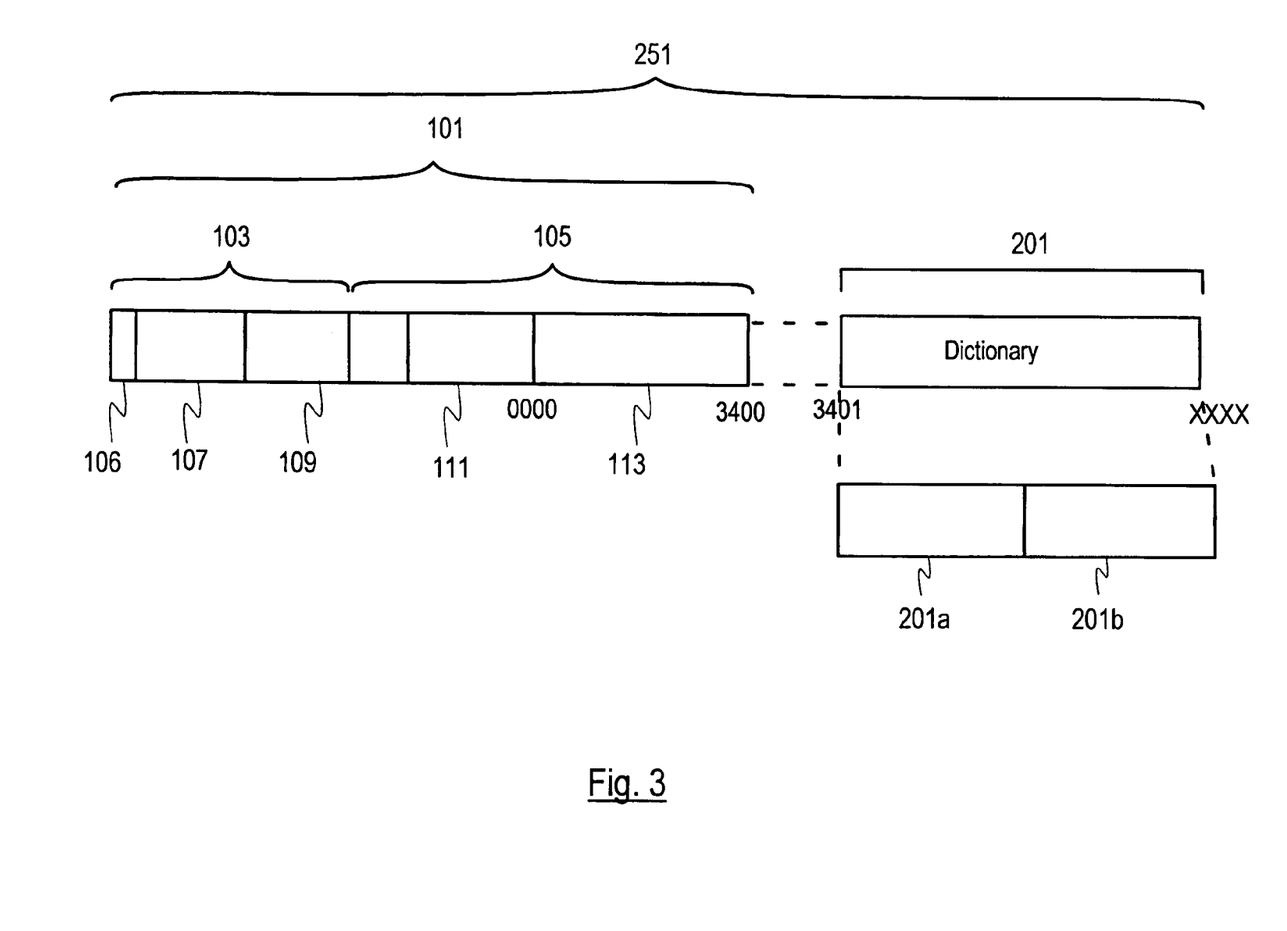
FIG. 3 shows a schematic view of UDVM memory system in accordance with an embodiment of the invention.

With reference to FIG. 3 an improved decompression memory block 251 incorporating an embodiment of the present invention is shown. Where the improved decompression memory block shares features as used by the typical memory block then the same reference numerals have been used.

The improved decompression memory block 251 comprises a SigComp portion 103, a UDVM portion 105, and an external dictionary portion 201. The SigComp portion 103 itself comprises a SigComp header portion 106 for storing any SigComp message header items, a Bytecode portion 107 for storing any received decompression algorithm instructions, and a compressed message portion 109 buffering at least part of the received compressed message or received compressed data stream. In some examples the Bytecode portion is not used as the instruction set used by the UDVM is loaded from a previously stored instruction set.

The UDVM portion 105 comprises a bytecode portion 111 for storing the instructions for carrying out the decompression and a ring buffer 113.

The external dictionary portion 201 is used for the storing of known dictionaries to assist the decompression of the compressed message.

In a first embodiment of the present invention the external dictionary portion is allocated the memory addresses directly after the memory addresses used for the ring buffer 113. Therefore if for example as shown in FIG. 3 the ring buffer was allocated the memory address range from 0000 to 3400, then the external dictionary portion is allocated the memory address range from 3401 to XXXX where XXXX is the final memory address for the external dictionary portion.

In other embodiments of the present invention the external dictionary portion is allocated the memory addresses other than those directly following the ring buffer with the methods applied below, and in particular the searching for a match in the compressor, being modified to take into account the location of the virtual machine memory and the location of the external dictionary portion memory.

In some embodiments of the present invention the external dictionary portion 201 comprises a static dictionary portion 201a and a dynamic dictionary portion 201b. In further embodiments of the present invention the external dictionary portion comprises more than one static or dynamic dictionary portion (not shown). In other embodiments of the present invention the external dictionary portion comprises only a static or dynamic portion (not shown).

The improved compression memory similarly comprises a ring buffer and an external dictionary portion.

The use of the external dictionary portion allows the compressor and decompressor to be operated differently from the typical SigComp procedures as described above.

Figure 4:
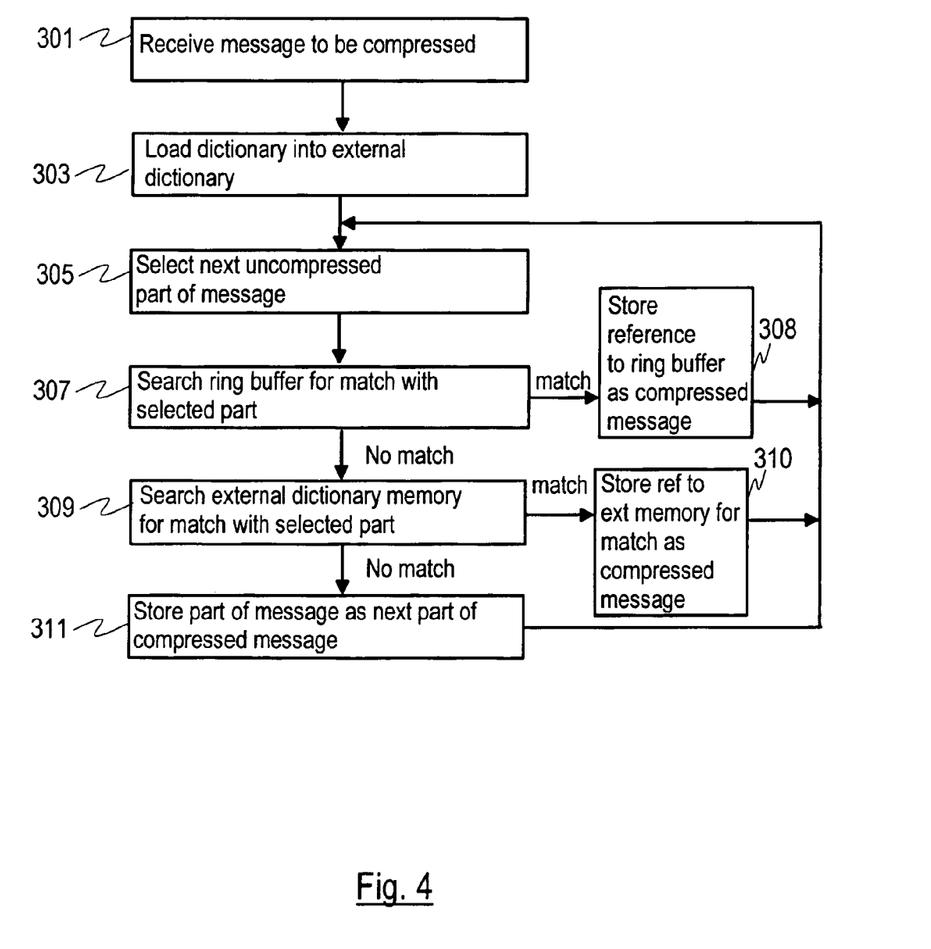
FIG. 4 shows a flow diagram for the operation of the UDVM during a compression operation in accordance with an embodiment of the present invention.

With reference to FIG. 4 a flow diagram of an improved compressor incorporating an embodiment of the present invention is shown.

The first step 301 the message to be compressed is received.

The next step 303 the compressor loads the external dictionary portion with copies of static and/or dynamic dictionaries.

The following step 305 selects the next uncompressed part of the message, If there are no further uncompressed parts then the operation stops.

The following step 307 searches the ring buffer for a copy of the selected uncompressed part.

If a match is detected the next step 308 outputs a reference to the ring buffer in terms of a position, length pair as a part of the compressed data message and a copy of the uncompressed part is appended to the ring buffer. The method then returns to step 305 to select the next uncompressed part.

If no match is detected in the ring buffer the next step is 309. Step 309 searches the external dictionary portion for a match with the selected uncompressed part.

If a match is detected in the external dictionary portion the next step, 310, outputs a reference to the external dictionary portion in terms of a position, length pair as a part of the compressed data message and a copy of the uncompressed part is appended to the ring buffer. The method then returns to step 305 to select the next uncompressed part.

If no match is detected in the external dictionary and also therefore in the ring buffer then the next step is 311. In step 311 the selected portion of the uncompressed message is output as a part of the compressed data message as a 'literal' value and a copy of the uncompressed part is also appended to the ring buffer. The method then returns to the step 305 to select the next uncompressed part.

A further example of the method of compression is described with reference to the pseudocode below. In this example the ring portion is searched by ring search and external dictionary portion comprises a first dictionary dict1, and a second dictionary dict2 which are searched by dict1.search and dict2.search.

```
def deflate_extra(compressed_stream, ring, message, dict1, dict2):
    start = 0
    while start < len(message):
        s = message[start:]
        position, length = ring.search(s)
        if dict1:
            d_position, d_length = dict1.search(s)
            if d_length > length:
                position, length = ring.max_position + d_position, d_length
            if dict2:
                d_postion, d_length = dict2.search(s)
                if d_length > length:
                    position, length = (
                        ring.max_position + dict1.max_position +
                        d_position, d_length)
        s = s[:length]
        if length > 1:
            compressed_stream.append((length, position))
        else:
            compressed_stream.append(s)
        ring.append(s) # Insert match or literal into ring
        start += length
```

In both of these examples the use of an external dictionary portion produces the improvement over the previous compressors whereby the appending of the message part is unable to overwrite the dictionary and therefore the compression efficiency produced by the use of the dictionary is not degraded.

Figure 5:
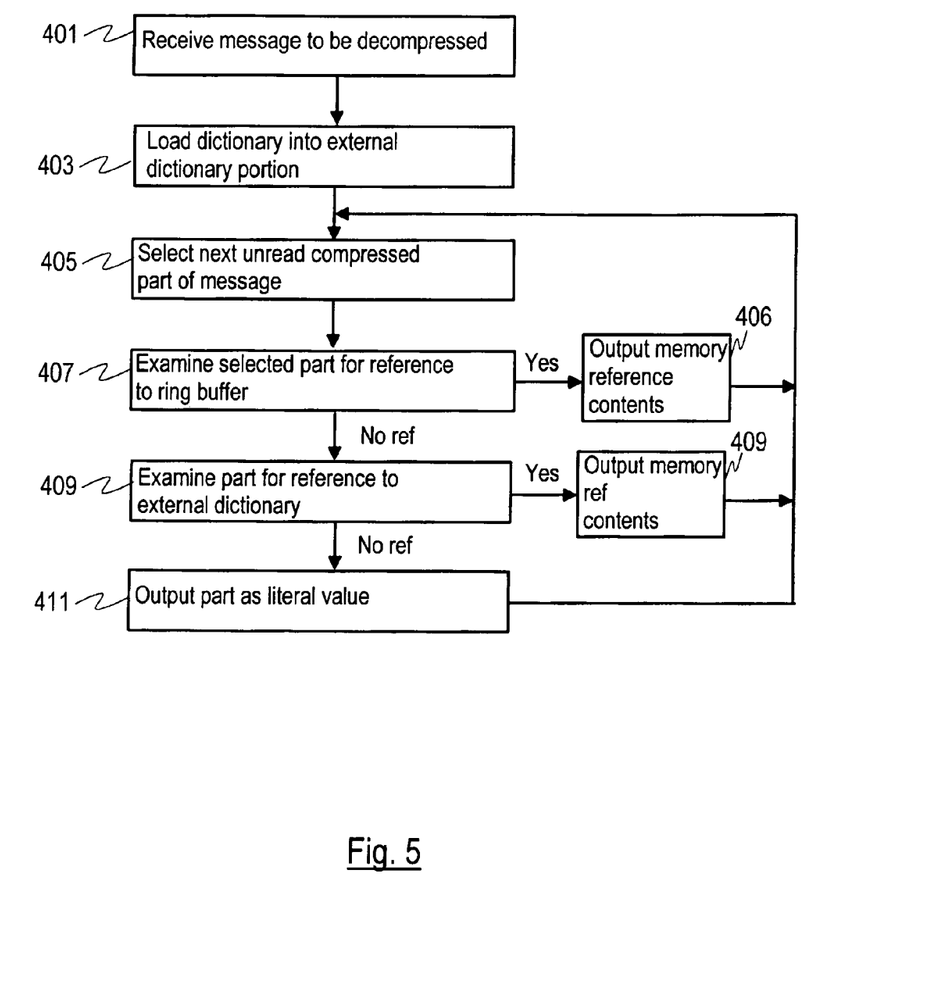
FIG. 5 shows a flow diagram for the operation of the UDVM during a decompression operation in accordance with an embodiment of the present invention.

With reference to FIG. 5 a flow diagram of an improved decompressor incorporating an embodiment of the present invention is shown.

The first step 401 the message to be decompressed is received.

The next step 403 the decompressor loads the external dictionary portion with copies of static and/or dynamic dictionaries.

The following step 405 selects the next unread part of the message, If there are no further unread parts then the operation stops.

The following step 407 examines the selected part for a reference to the ring buffer.

If a reference match is detected the next step 408 receives the content of the memory reference from the ring buffer as defined by the memory position, and length. The step further outputs the content as a part of the compressed data message and further appends the content to the ring buffer. The method then returns to step 405 to select the next unread part.

If no ring buffer reference match is detected the next step is 409. Step 409 examines the selected part for a reference to the external dictionary portion.

If an external dictionary portion match is detected the next step, 410, receives the content of the memory reference from the external dictionary portion as defined by the memory position and length. The step further outputs the content as a part of the compressed data message and further appends the content to the ring buffer. The method then returns to step 405 to select the next uncompressed part.

If no external dictionary portion match is detected and also therefore in the ring buffer then the next step is 411. In step 411 the selected portion of the compressed message is output as a part of the decompressed data message as the reading of a 'literal' value and furthermore a copy of the 'literal' is also appended to the ring buffer. The method then returns to the step 405 to select the next uncompressed part.

Although the above improved compression and decompression methods are described above as having two separate search and two reference examination steps, in some embodiments of the present invention the two steps can be combined as a single extended search or examination. These embodiments are advantageous where the external dictionary portion is assigned memory location addresses adjacent to the ring buffer memory locations.

In some further embodiments of the present invention the reference to the ring buffer and/or the external dictionary portion of the memory further comprises an indicator portion to provide an explicit indication, other than the memory location value, as whether the content was matched in the ring buffer or the external dictionary portion.

The examples of the invention have been described in the context of an IMS system and GPRS networks. However, this invention is also applicable to any other standards. Furthermore, the given examples are described in the context of the so called all SIP networks with all SIP entities and communication channels known as PDP contexts. This invention is also applicable to any other appropriate communication systems, either wireless or fixed line systems, communication standards and communication protocols.

Examples of other possible communication systems enabling wireless data communication services, without limiting to these, include third generation mobile communication system such as the Universal Mobile Telecommunication System (UMTS), i-phone or CDMA2000 and the Terrestrial Trunked Radio (TETRA) system, the Enhanced Data rate for GSM Evolution (EDGE) mobile data network. Examples of fixed line systems include the diverse broadband techniques providing Internet access for users in different locations, such as at home and offices. Regardless the standards and protocols used for the communication network, the invention can be applied in all communication networks wherein registration in a network entity is required.

The embodiment of the invention have been discussed in the context of proxy and servicing call state control functions. Embodiments of the invention can be applicable to other network elements where applicable.

Furthermore it is noted that embodiments of the present invention can be controlled by hardware, software or any combination of hardware and software.

It is also noted herein that while the above describes exemplifying embodiments of the invention, there are several variations and modifications which may be made to the disclosed solution without departing from the scope of the invention as defined in the appended claims.

The invention claimed is:

1. A method for compressing a signalling message in a compressor in a communication system, the compressor comprising a compression memory, wherein the compression memory comprises a first memory in a virtual machine and a second memory external to the virtual machine, the method comprising the steps of:
receiving a part of the signalling message, the part comprising an uncompressed part of the signalling message;
loading a dictionary into the second memory external to the virtual machine;
searching the second memory for a copy of the received part of the signalling message;
determining a reference to the received part of the signalling message on the basis of the searching step; and
outputting the reference to the second memory as a part of a compressed signalling message representing the received part of the signalling message.

2. The method as claimed in claim 1, further comprising the searching the first memory for the copy of the received part of the signalling message, wherein the reference is determined on the basis of the searching the second memory and the further searching steps.

3. The method as claimed in claim 1, further comprising the step of, prior to the step of receiving a part of the signalling message, writing data to the second memory.

4. The method as claimed in claim 1, further comprising the step of writing the copy of the received part of the signalling message to the first memory after determining the reference to the received part.

5. The method as claimed in claim 1, wherein the first memory comprises a ring buffer.

6. The method as claimed in claim 1, wherein the second memory includes at least one of:
a dynamic dictionary; and
a static dictionary.

7. The method as claimed in claim 1, wherein the virtual machine is a universal decompression virtual machine.

8. A method for decompressing a compressed signalling message in a decompressor in a communications system, the decompressor comprising a decompression memory, wherein the decompression memory comprises a first memory in a virtual machine and a second memory external to the virtual machine, the method comprising the steps of:
receiving a part of a compressed message, the part comprising an uncompressed part of the signalling message;
loading a dictionary into the second memory external to the virtual machine;
determining whether the part of the compressed message comprises a second memory reference;
selecting a value on the basis of the determining step; and
outputting the value as a part of a decompressed message.

9. The method as claimed in claim 8, further comprising the step of determining whether the received part of the compressed message comprises a first memory reference, wherein the value is selected on the basis of the determining whether the part of the compressed message comprises a second memory reference and the further determining steps.

10. The method as claimed in claim 9, wherein when the determining step determines the first memory reference, the selecting step comprises the step of reading a content of the first memory reference from the first memory, wherein the selected value is the content of the first memory reference.

11. The method as claimed in claim 8, further comprising the step of, prior to the step of receiving the part of the compressed message, writing data to the second memory.

12. The method as claimed in claim 8, comprising the further step of writing a copy of the value to the first memory.

13. The method as claimed in claim 8, wherein when the determining step determines the second memory reference, the selecting step comprises the step of reading a content of the second memory reference from the second memory; wherein the selected value is the content of the second memory reference.

14. The method as claimed in claim 8, wherein when the determining step determines no first memory reference or no second memory reference the selected value is the received part of the compressed message.

15. The method as claimed in claim 8, wherein the virtual machine is a universal decompression virtual machine.

16. A compressor for compressing a signalling message in a communication device operating within a communications system, the compressor comprising:
a first memory in a virtual machine;
a second memory external to the virtual machine, wherein the virtual machine further comprises
a receiver arranged to receive a content of a part of the signalling message, the part comprising an uncompressed part of the signalling message,
a loader loading a known content the second memory external to the virtual machine;
a comparator arranged to compare the received content with at least one portion of a content of the first memory and the known content the second memory,
a reference generator arranged to receive an output from the comparator, and output a reference value to the second memory, wherein the reference value output is arranged to be dependent on the output from the comparator, and
wherein the reference value output from the compressor is part of a compressed signalling message.

17. The compressor as claimed in claim 16, further comprising a memory loader arranged to write the content received from the receiver to the first memory.

18. The compressor as claimed in claim 16, wherein the first memory comprises a ring buffer.

19. The compressor as claimed in claim 16, wherein the second memory includes at least one of:
a static dictionary; and
a dynamic dictionary.

20. The compressor as claimed in claim 16, wherein the virtual machine is a universal compression virtual machine.

21. A decompressor for decompressing a signalling message in a communication system, comprising:
- a first memory in a virtual machine,
- a second memory external to the virtual machine, wherein the virtual machine further comprises
    - a receiver arranged to receive a part of the compressed message, the part comprising an uncompressed part of the signalling message,
    - a loader loading a dictionary into the second memory external to the virtual machine;
    - a detector arranged to detect whether the received part of the compressed message comprises a reference to the first memory or the second memory and arranged to select an output dependent on the detection,
    - a value generator arranged to output a value dependent on the output of the detector, wherein the value output is part of a decompressed message.

22. The decompressor as claimed in claim 21, further comprising a memory loader arranged to write a value generated to the first memory.

23. The decompressor as claimed in claim 21, wherein the first memory comprises a ring buffer.

24. The decompressor as claimed in claim 21, wherein the second memory includes at least one of:
- a static dictionary; and
- a dynamic dictionary.

25. The decompressor as claimed in claim 21, wherein the virtual machine is a universal compression virtual machine.

26. A computer program product storing a stored computer program, the computer program product being used for implementing a method for compressing a signalling message in a compressor in a communication system, the compressor comprising a compression memory, wherein the compression memory comprises a first memory in a virtual machine and a second memory external to the virtual machine, the method comprising:
- receiving a part of the signalling message, the part comprising an uncompressed part of the signalling message;
- a loader a dictionary into the second memory external to the virtual machine;
- searching the second memory for a copy of the received part of the signalling message;
- determining a reference to the received part of the signalling message on the basis of the searching step; and
- outputting the reference to the second memory as a part of a compressed signalling message representing the received part of the signalling message.

27. A computer program product storing a stored computer program, the computer program product being used for implementing a method for decompressing a compressed signalling message in a decompressor in a communications system, the decompressor comprising a decompression memory, wherein the decompression memory comprises a first memory in a virtual machine and a second memory external to the virtual machine, the method comprising the steps of:
- receiving a part of a compressed message, the part comprising an uncompressed part of the signalling message;
- a loader loading a dictionary into the second memory external to the virtual memory;
- determining whether the part of the compressed message comprises a second memory reference;
- selecting a value on the basis of the determining step, and
- outputting the value to the second memory as a part of a decompressed message.

* * * * *

UNITED STATES PATENT AND TRADEMARK OFFICE
CERTIFICATE OF CORRECTION

PATENT NO.       : 7,653,079 B2
APPLICATION NO.  : 11/249350
DATED            : January 26, 2010
INVENTOR(S)      : Pekka Pessi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this

Twenty-eighth Day of December, 2010

David J. Kappos
*Director of the United States Patent and Trademark Office*